United States Patent [19]

Wollbeck et al.

[11] Patent Number: 4,740,344
[45] Date of Patent: Apr. 26, 1988

[54] METHOD FOR THE PRODUCTION OF HEAT AND/OR FLUID EXCHANGERS THAT CONTAIN TUBES

[75] Inventors: Rudi Wollbeck, Erlenbach; Thomas Zang, Goldbach, both of Fed. Rep. of Germany; Dirk A. Klarenberg, CK Dieren; Hugo P. Korstanje, CK Rozendaal, both of Netherlands

[73] Assignee: Akzo NV, Arnhem, Netherlands

[21] Appl. No.: 751,121

[22] Filed: Jul. 2, 1985

[30] Foreign Application Priority Data

Jul. 18, 1984 [DE] Fed. Rep. of Germany ....... 3426445
Dec. 19, 1984 [DE] Fed. Rep. of Germany ....... 3446293

[51] Int. Cl.$^4$ ............... B29C 45/14; B29C 45/73; B29C 65/02
[52] U.S. Cl. ............... 264/248; 165/148; 249/63; 249/122; 249/145; 249/177; 264/254; 264/263; 264/277; 264/279; 264/279.1; 264/328.16; 264/DIG. 65; 425/117; 425/123; 425/468; 425/577
[58] Field of Search ........... 264/261, 263, 277, 328.16, 264/345, DIG. 65, 262, 248, 254, 279, 279.1; 425/123, 117, 468, 577; 29/157.3 R, 157.3 C, 157.4; 165/148, 151, 152, 153; 249/63, 122, 145, 177

[56] References Cited

U.S. PATENT DOCUMENTS 3,471,178 10/1969 Roe ............... 264/261 X
4,352,772 10/1982 Bezner ............... 264/277 X

FOREIGN PATENT DOCUMENTS 0022234 1/1981 European Pat. Off.
2028710 12/1971 Fed. Rep. of Germany .
2051593 4/1972 Fed. Rep. of Germany .
2728827 5/1979 Fed. Rep. of Germany .
3027087 2/1981 Fed. Rep. of Germany .
2824934 10/1983 Fed. Rep. of Germany .
2267868 11/1975 France ............... 425/123
2399637 9/1979 France .
58-63428 4/1983 Japan ............... 264/328.16
59-136213 8/1984 Japan ............... 264/328.16
731431 6/1955 United Kingdom .
1596406 8/1981 United Kingdom .

Primary Examiner—Jeffery Thurlow
Assistant Examiner—Leo B. Tentoni
Attorney, Agent, or Firm—Parkhurst & Oliff

[57] ABSTRACT

The invention comprises a method and apparatus wherein an insert, preferably made of plastic and preferably allowing a melt-on bonding with the tubes and whose floor has a traversing opening for each tube, is inserted into the first part of the injection mold (top mold or bottom mold) as a positioning element for the tubes in such a manner that the insert is at least partially locked or secured into the first part of the injection mold. A tube is then placed in each opening of the insert. A mandrel is then placed in each tube, whereupon the injection mold is locked in such a manner that, if necessary, the mandrels are locked into the second part of the injection mold (bottom mold or top mold). A molten thermoplastic material is then injected, via a sprue provided in the injection mold, into a cavity formed by the injection mold, the insert and the tube ends. The parts of the injection mold are separated after cooling of the thermoplastic material, which is maintained under pressure during the cooling at least initially. The mandrels are then removed and the tubes bonded to the insert by the thermoplastic material are removed from the first part of the injection mold and, if appropriate, the free ends of the tubes are also bonded to a second insert by means of the injection mold.

30 Claims, 11 Drawing Sheets

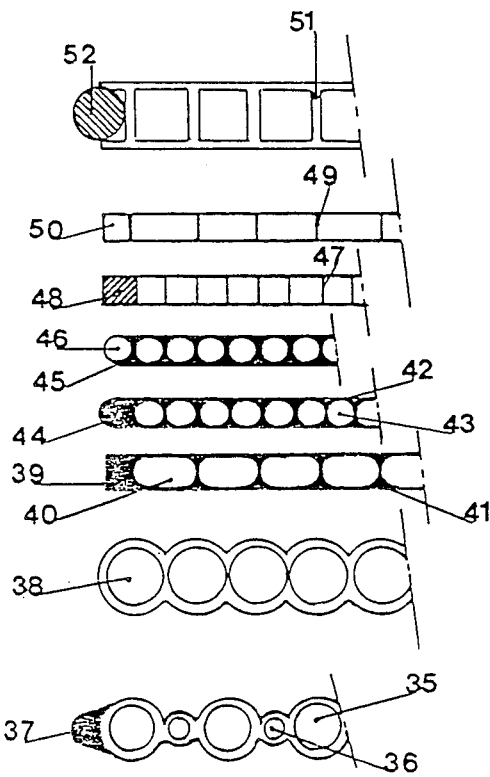
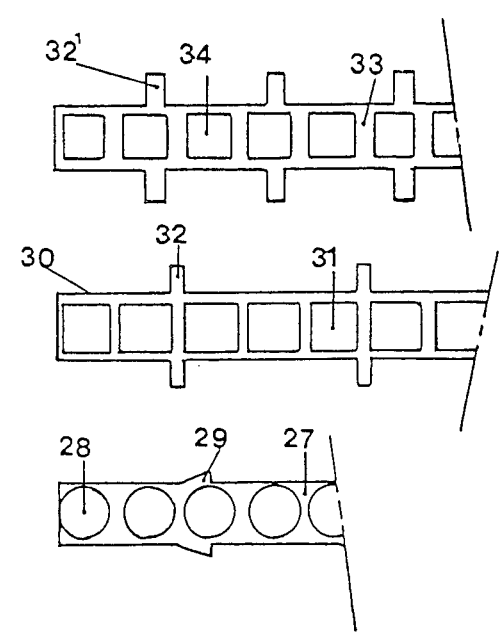
Fig 27
Fig 26
Fig 25
Fig 24
Fig 23
Fig 22
Fig 21
Fig 20
Fig 19
Fig 18
Fig 17

METHOD FOR THE PRODUCTION OF HEAT AND/OR FLUID EXCHANGERS THAT CONTAIN TUBES

BACKGROUND OF THE INVENTION

The present invention relates to a method for the production of heat and/or fluid exchangers containing tubes through injection molding of a thermoplastic material by means of an injection mold comprising at least two parts, such as a top mold and a bottom mold. The present invention also relates to an apparatus for the production of heat and/or fluid exchangers containing tubes through an injection mold comprising at least two parts for the implementation of said method.

A method and an apparatus for the production of fluid exchangers has been disclosed in German Patent Application No. 28 24 934 in which a bundle of hollow filaments is inserted into a casting mold which is then filled with molten thermoplastic material. After the thermoplastic material has solidified, the bundle of filaments is removed from the mold and cut within the range of the solidified thermoplastic material. In this manner, two tube bases are created. If tube bases are molded onto both ends of the bundle of hollow filaments, a fluid exchanger is created which then needs to be fitted with the required connections and which may be placed inside a housing. German Patent Application No. 28 24 934 further discloses that attempts had already been made to obtain tube bases by pressure impregnating each end of the precut bundle of hollow filaments with polymeric materials. This pressure impregnation presents a drawback, however, in that the extremely thin walls of the hollow filaments would break or be crushed and that the open ends of the filaments easily clog up.

German Patent Application No. 30 27 087 discloses a generic method in which several tubes are provided with a tube base by injection molding, with projections being inserted into the tubes for purposes of injection molding. However, this method can only be applied when, after injection molding, the tubes are in one plane. The strength of the bond between the tubes and the tube base barely exceeds the strength achieved by adhesive bonding. This method becomes very costly when, after injection molding, the tubes are to be positioned in several planes. Frequently, this method cannot be used at all because of the positioning desired for the tubes.

It is also known from European Patent Application EP-A-22 234 to bond metal tubes with a tube base by first inserting the metal tubes into the tube base and then coating the outside of the tube base with adhesive material. To enhance the strength of the adhesive, the latter may be subjected to increased pressure after the coating. In addition, the metal tubes are connected between the two tube bases by a plurality of lamellae. This type of bonding demands many steps in the production, and the curing of the adhesive bond takes a long time. The coating of the tube base with adhesive also takes a long time and requires increasing care as the number of tubes to be glued to the tube base is raised.

DESCRIPTION OF THE INVENTION

It is the object of the present invention, while avoiding the drawbacks described above, to provide a method and an apparatus for the production of heat and/or fluid exchangers containing tubes by injection molding of a thermoplastic material, using an injection mold composed of at least two parts, such as top and bottom mold, especially suited for thin walled and/or easily deformed tubes, and ensuring a strong bond between tubes and tube base.

The object of the invention is achieved by a method characterized in that an insert, preferably made of plastic and preferably allowing a melt-on bonding with the tubes and whose floor has a traversing opening for each tube, is inserted into the first part of the injection mold (top mold or bottom mold) as a positioning element for the tubes in such a manner that said insert is at least partially locked or secured into the first part of the injection mold. A tube is then placed in each opening of the insert. A mandrel is then placed in each tube, whereupon the injection mold is locked in such a manner that, if necessary, the mandrels are locked into the second part of the injection mold (bottom mold or top mold). A molten thermoplastic material is then injected, via a sprue provided in the injection mold, into a cavity formed by the injection mold, the insert and the tube ends. The parts of the injection mold are separated after cooling of the thermoplastic material, which is maintained under pressure during the cooling at least initially. The mandrels are then removed and the tubes bonded to the insert by the thermoplastic material are removed from the first part of the injection mold and, if appropriate, the free ends of the tubes are also bonded to a second insert by means of the injection mold.

In general, the insert is made of plastic, but it is sufficient if the insert is made of some other material and is provided with a sufficiently thick plastic coating at those points where the bond between insert and thermoplastic material or between insert and tubes is to be created.

The present method is particularly suitable for the production of tube bases of heat and/or fluid exchangers where the injection molding process normally involves high pressure injection of a molten thermoplastic material through the sprue into the cavity formed by the injection mold. Pressures of up to 80 bar are customarily used for the injection molding of thermoplastic material. Higher pressures may be appropriate, depending on the composition of the thermoplastic material or the design of the injection mold.

Injection molding by the method of the present invention is not limited to the use of pure thermoplastic materials as injection molding material. The thermoplastic materials may also be mixed with suitable fillers which can be used in the following forms:

beads or particles with isotropic dimensions, such as tallow, metal, oxides, graphite, fluxing materials, etc.

small rods or other particles in which one dimension is noticeably greater than the other two, such as carbon fibers, asbestos structures, synthetic fibers, natural fibers, etc.

pellets and other particles in which two dimensions are noticeably greater than the third one, such as mica varieties like phlogopite, muscovite, etc.

It may also be advantageous to subject the product obtained by the present method, e.g. the tube base, to further treatment, possibly after additional parts, such as flanges, tubes, etc., have been attached. For instance, gamma, Roengen, high-frequency or ultra-violet irradiation may be applied, whereby the softening point of the thermoplastic injection-molded material can be raised.

Within the scope of the invention the term "tube" includes all tubular bodies, such as pipes, hoses or hollow filaments. The shape of the tubes is not limited to circular cross-sections; the tubes may also have elliptical or polygonal crosssections, including triangular, quadrilateral, square, pentagonal, etc. The thickness of the tube wall, formed by the inside and outside cross-sections, may be uniform or may vary along the perimeter of the tube. Inside and outside crosssections may have the same shape or may differ from each other. For example, the outside cross-section of a tube may be a polygon while the inside shape is a circle or an ellipse. Moreover, the inside cross-section of each tube may present one or several continuous hollow spaces. The contour of the outside and/or inside cross-section of the tubes may have tuft-like elevations or ribs to enhance turbulence in the flow of the fluid, thus raising the effectiveness of the exchanger. Tubes for which the method of the present invention is particularly advantageous are normally made of polymers. Suitable polymers are, for example, polyamide, polyester, polycarbonate, polypropylene, polyethylene, polyisobutylene, PVC, injection-moldable copolymers containing tetrafluoro ethylene monomers, polyvinylidene fluoride (PVDF), aromatic etherimides, polysulfone, polyether sulfone, or polyester ether ketone (PEEK).

The insertion of the tubes is advantageously effected by placing one tube in each opening of the insert so that the tube end protrudes inside beyond the inside bottom of the insert. To ensure secure positioning of the tubes in the insert during the injection molding process, the tubes may be fastened so as to prevent any longitudinal shift.

In implementing the method of the invention it is advantageous if the injection mold is cooled to cool the thermoplastic material. In the simplest version, cooling of the injection mold can be achieved by means of a hole drilled into the top and/or bottom mold, through which a tempering agent, such as water, oil or gas can be made to flow.

To prevent sticking of the injection material or of the tubes to the injection mold or to the mandrels, it is advantageous if the interior surface of the injection mold and the outer surface of the mandrels are smooth, polished or coated with a material that prevents adhesion between tubes and mandrels.

Adhesion between mandrels and tubes can also be prevented effectively by cooling the mandrels during and/or after the injection molding process. In this context, it is advantageous that the mandrels offer continuous hollow space through which a coolant can flow. Practically any known liquid or gaseous coolants can be used for this purpose. It has proven advantageous, however, if the coolant used is a gas, preferably air or helium. The coolant may be fed to the mandrels through the injection mold, drainage being effected through the tubes, or else ambient air can be sucked in through the mandrels.

A particularly advantageous embodiment of the method of the invention is characterized in that several tubes are grouped together initially and that the groups of tubes are placed in corresponding traversing openings in the floor of the insert. Hollow filaments, for example, can be embedded as weft filaments in a woven structure, but flexible tubes may also be grouped together by twisting. The method of the invention is facilitated if the tubes are grouped together with axes parallel or almost parallel to each other. Such grouping can, for example, be achieved advantageously if the resulting cross-section of the groups of tubes, perpendicular to the axis of said tubes, is in the form of an even, shaped or spiral sheet.

The grouping of the tubes can, for example, be effected even as the tubes are produced. To this effect, the tubes may be assembled during the molding process while they are still in a sticky state so that they will adhere to each other.

It is also possible to group tubes of differing cross-sections. Plate-like structures that have several continuous hollow spaces and thus present, for example, the shape of tube sheets can, within the scope of the invention, be referred to as tubes or groups of tubes. Such plate-like structures featuring several continuous hollow spaces may present the shape of an even sheet, but they may also take on the form of a shaped or spiral sheet. Examples of shaped and spiral sheets are shown in the drawings and explained in the descriptions of the figures.

It has proven advantageous if 20 to 2,000, 20 to 1,000, or preferably 20 to 100 tubes are grouped together. For example, it has proven advantageous if sheets with 20 to 1,000, or, preferably, 20 to 100, continuous hollow spaces are used as basic material in implementing the method of the invention.

The method of the invention can also be advantageously applied if tubes of nonporous material or tubes of porous material with a pore volume of up to 90% are used, whose hydraulic diameter $d_h$ measures 0.5 to 25 mm, preferably 0.5 to 15 mm. A further preferred range is 0.8 to 10 mm.

As is known, the hydraulic diameter $d_h$ is defined as four times the inside cross-section divided by the wetted inside perimeter (cf. Dubbel, Taschenbuch fuer den Maschinenbau [Pocket Handbook of Mechanical Engineering], 13th edition, 1970, p. 314, para. 4):

$d_h = 4 \times$ inside cross-section area/wetted inside perimeter.

Since the hydraulic diameter $d_h$ is expressed in terms of the inside cross-section, the requirement that the hydraulic diameter should measure 0.5 to 25 mm applies in the case of groups of tubes or tube sheets to each individual continuous hollow space.

For tubes whose hydraulic diameter measures 0.5 to 25 mm or 0.5 to 15 mm, the method of the invention is particularly successful if the thinnest part of the tube walls measures about 5 to 25% of the hydraulic diameter $d_h$.

If nonporous tubes or porous tubes with a pore volume of less than 50% are used, it is advantageous for their hydraulic diameter $d_h$ to measure 0.5 to 5 mm, preferably 0.8 to 3 mm. A tube wall thickness that measures about 7.5 to 17.5% of the hydraulic diameter $d_h$ at its thinnest point is preferred. The tubes, the inserts and the thermoplastic material used for injection molding are advantageously made of thermoplastic polymers. It is also advantageous if, at least in the areas where the bonding between them is effected, these thermoplastic polymers, of which the tubes, the inserts and the thermoplastic material are made, belong to the same type of polymer with respect to basic structure. It is also particularly advantageous if, at least in the areas where the bonding between them is effected, the tubes, the inserts and the thermoplastic material are made of thermoplastic polymers that present the same or almost the same melting point or range of melting temperature.

When the method of the invention is applied, there are no problems with regard to the sealing power and strength of the bonding between tube and tube base. The sealing power and strength of the bonds between tube and tube base is influenced in a particularly advantageous manner if, before injection of the thermoplastic material, at least the tubes are heated to a temperature $T_c$ that lies below the melting point temperature, $T_m$, for the tube material, and if the thermoplastic material already heated to a melt is raised to temperature $T_i$ that is higher than $T_m$, and if the temperature differentials $T_i-T_m$ and $T_m-T_c$ are selected so that when the melt is injected, the tubes are heated temporarily to a point where they will firmly fuse with the insert of the area of the insert openings at least over a distance equal to the thickness of the tube walls. For polymers that have a definite melting point, $T_m$ corresponds to the melting point temperature. For polymers that have a range of melting point temperatures, $T_m$ corresponds to the mean value in the temperature range.

A particularly strong bonding between tube and tube base is achieved by selecting the temperature differentials $T_i-T_m$ and $T_m-T_c$ so that when the melt is injected the tubes are temporarily heated to the point where they will firmly fuse with the insert over the total length of the openings of said insert.

The temperature differential $T_i-T_m$ is advantageously selected between 20° and 90° C., preferably between 30° and 70° C. In applying the method of the invention, it was observed that particularly strong and durable bonding between tubes and tube base is achieved in this range of temperature differentials. This applies particularly when the temperature differential $T_m-T_c$ is at least equal to $T_i T_m$ and, at most, equal to $T_m -40°$ C. The cooling of the tubes must be initiated at the start of or during the melt injection process.

The selected temperatures to which the tubes are to be heated or cooled before, during and after the injection of the melt are advantageously adjusted by means of a gas made to flow through the hollow spaces of the mandrels.

Thermoplastic materials that have proven to be particularly suitable for tubes, inserts and injection material are PVDF, polypropylene, polyethylene and polycarbonate.

The object of the invention is also achieved by an apparatus for the production of heat and/or fluid exchangers containing tubes. The apparatus comprises an injection mold which includes at least two parts. The injection mold also includes an insert for positioning the mandrels which is at least partially locked into the first part of the two parts of the injection mold. The first part of the injection mold has a common opening for all the tubes and the insert has one traversing opening for each tube. The inside dimension of the traversing opening corresponds to the outside dimension of the corresponding tube. The second part of the injection mold is fitted with devices to hold a number of mandrels whose outside dimensions correspond to the inside dimensions of the corresponding tubes and whose number corresponds to the number of the tubes in the heat and/or fluid exchanger to be produced. The injection mold also includes a sprue. The mandrels may be inserted into the tubes individually or in groups. The mandrels present a shoulder up to which they can be inserted. The second part of the injection mold is placed on the first part of the injection mold so that the mandrels are positioned in openings or drill holes provided for this purpose in the second part of the injection mold. If the number of tubes is very large, the mandrels may also be grouped together and connected to each other in the positioning area for said mandrels. The mandrels may also be secured in the second part of the injection mold. In such an embodiment, the mandrels are inserted into the tube openings when the second part of the mold is placed on the first part.

It is useful for the first and/or second part of the injection mold to be equipped with a cooling device. In the simplest version, such a cooling device may be a drill hole, located in the first or second part of the injection mold, through which the coolant, such as chilled water, chilled gas or chilled air, may flow. The first and/or second part of the injection mold may also contain a heating device. The heating device and cooling device may be the same device.

Heating or cooling of the mandrels can be achieved advantageously if all hollow spaces of the mandrels in the second part of the injection mold are connected to a fluid distributor. Said fluid distributor can at the same time also serve as a heating or cooling device for the second part of the injection mold.

The insert in the first part of the injection mold which, when the process of the invention has been completed, becomes an integral part of the tube base of the heat and/or fluid exchanger produced, is preferably made of a thermoplastic polymer, while all other components of the injection mold (1st part, 2nd part, mandrels, etc.) are made of metal. This ensures good heat feed and removal for all parts of the injection mold. Usable metals are, for example, stainless steel, hardened steel or copper.

It is advantageous if the traversing openings of the insert provide a clearance fit with respect to the outside dimensions of the tubes. The concept of clearance fit is defined in DIN 7812, p. 2. Similarly, it is advantageous if the outside dimensions of the mandrels present a clearance fit with respect to the inside dimensions of the tubes.

The free ends of the mandrels are tapered to ensure that they can easily be inserted into the tubes. The free end of the mandrels is the one that is not positioned or secured in the second part of the injection mold and which is inserted into the tubes. To this effect, the mandrel ends are either pointed or shaped as truncated cones or are tapered in some way. The length of the mandrels is advantageously selected so that the mandrels will protrude through the openings of the insert when the injection mold is assembled. Thus, the length of the mandrels must be greater than the length of the tube to be produced so as to ensure support for the tubes over the total length embedded in the tube base.

In addition, it is advantageous if, except for the portion secured in the second part of the injection mold, the mandrels have a slight conical shape toward the free end so as to facilitate the withdrawal of the mandrels from the tubes at the end of the injection molding process.

It may also be useful, however, to design the mandrels so that, except for the portion secured in the second part of the injection mold, said mandrels present a diameter that decreases in the direction of the free end. If the molten material in the cavity formed by the parts of the injection mold and by the insert is under sufficiently high pressure and at a sufficiently high temperature, the tubes can undergo plastic deformation or fusion in the area of the tube base and, thus, take on the shape of the mandrels. The tubes can thereby be shaped into funnels which may produce favorable flow conditions around the tube base in the finished heat and/or fluid exchanger.

A further advantage of the apparatus of the invention results if the insert includes at least one groove along its inside perimeter. During the injection molding process, molten material flows into this groove preventing the thermoplastic material from being pressed out of the insert in the finished heat and/or fluid exchanger, even when great stress is applied to the tube base, for example, through extreme thermal expansion of the tubes.

The invention is further clarified by the following descriptions and examples.

BRIEF DESCRIPTION OF THE DRAWINGS

FIGS. 17 to 27 are cross-sectional views of several tube sheet embodiments;

DETAILED DESCRIPTION OF THE PREFERRED EMBODIMENTS OF THE INVENTION

Figure 1:
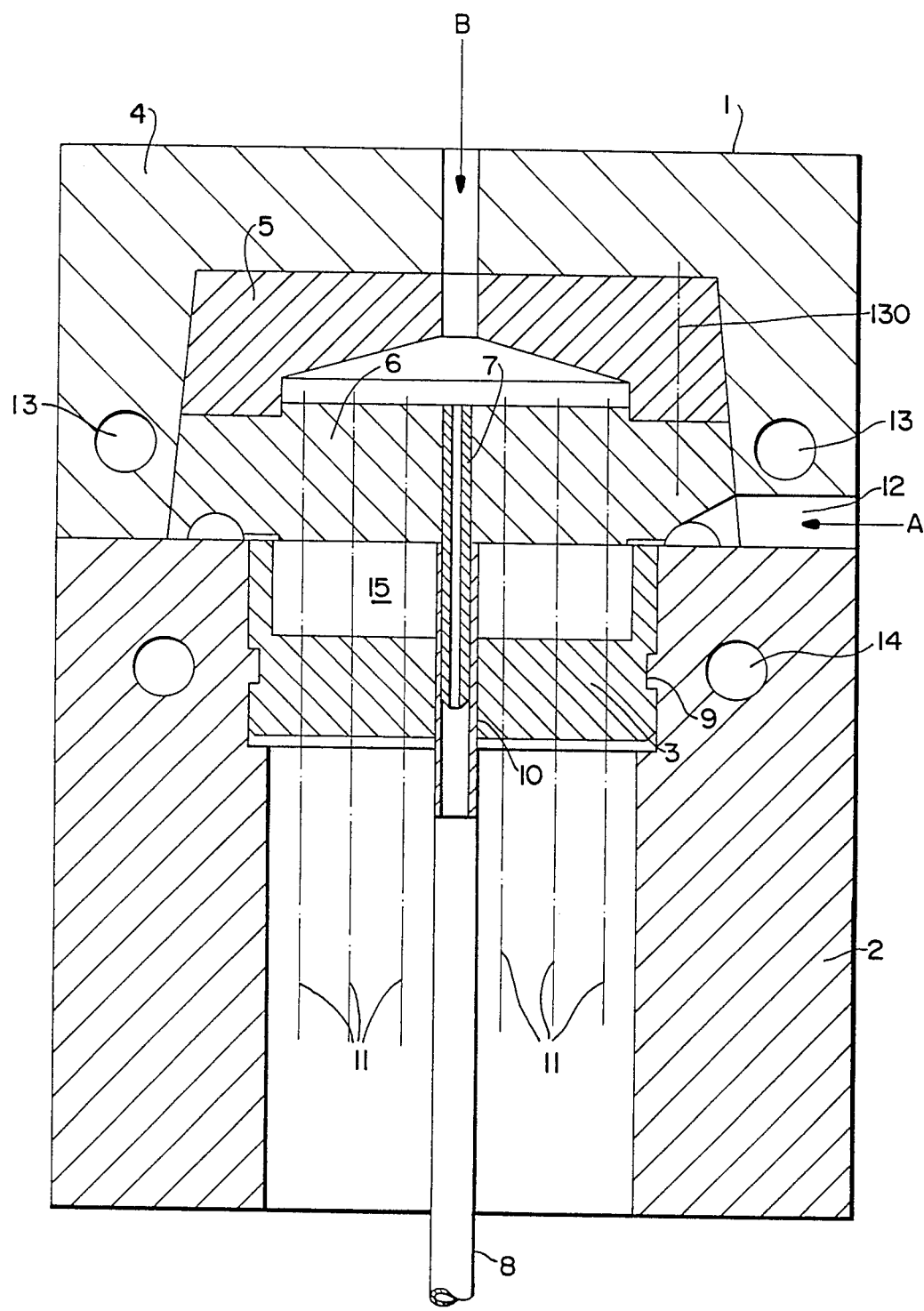
FIG. 1 is a schematic view of the apparatus of the invention for the production of a fluid and/or heat exchanger container tubes.

FIG. 1 is a schematic view of the apparatus of the invention for the production of a tubular fluid and/or heat exchanger, in assembled form, tubes having already been inserted into this apparatus. In this drawing the top mold is designated by 1 and the bottom mold by 2. Into bottom mold 2 is inserted a cylindrical insert 3 the floor of which presents a traversing opening 10 for each tube, the schematic drawing showing only one traversing opening. Into traversing opening 10 of cylindrical insert 3 a tube 8 is inserted to the upper edge of cylindrical insert 3. Tube 8 is shown in sectional view in the area of the cylindrical insert, and in the lower part of bottom mold 2 it is seen in top view. Additional tubes 8 are inserted along dot-and-dash lines 11, as indicated, by way of example, in FIG. 1. Top mold 1 comprising support 4 into which are mounted coolant distributor 5 and mandrel carrier 6. Support 4, coolant distributor 5, and mandrel carrier 6 may, for example, be held together by screws which are located where indicated by dot-and-dash lines 130. Mandrels 7 which feature continuous hollow spaces are mounted into mandrel carrier 6. For clarity, only one mandrel 7 is shown, but additional mandrels 7 may be placed, for example, along dot-and-dash lines 11. The free end of mandrel 7 is shaped as a truncated pyramid. The length of the mandrels is such that their free ends extend into the opening of insert 3, so that the length of the mandrel portion protruding from the top mold is greater than the thickness of the tube sheet to be produced. The continuous hollow spaces of mandrels 7 are supplied with coolant via the coolant inlet—identified in the drawing by arrow B—and via coolant distributor 5. After passing through the mandrels, said coolant flows into tubes 8, leaving them at their back end. The coolant may also be made to flow in the direction opposite to arrow B if a suction device is connected to coolant distributor 5. When suction is applied, the ambient air surrounding the injection mold serves as coolant. Insert 3 is provided at its outer surface with groove 9 into which bottom mold 2 engages to ensure the axial alignment of insert 3. Bottom mold 2 is made of two parts (not shown in the drawing), so that insert 3 can be inserted into the bottom mold.

The top mold is provided with a sprue 12 through which the melt for the production of the tube sheet is injected under high pressure in the direction of arrow A into cavity 15. Cavity 15 is formed by insert 3, mandrel carrier 6 (top mold) and tubes 8. Support 4 of top mold 1 includes holes 13 and bottom mold 2 includes drill holes 14 through which coolant can flow.

Figure 2:
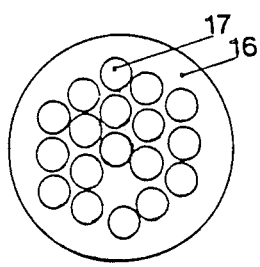
FIGS. 2 to 7 are cross-sectional views of tubes with several continuous hollow spaces.
Figure 3:
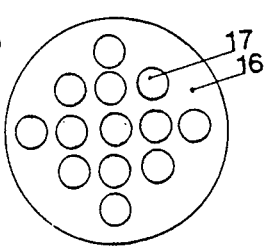
Figure 4:
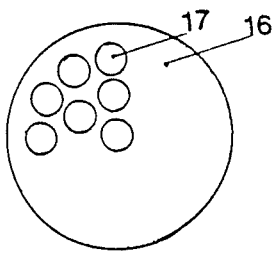
Figure 5:
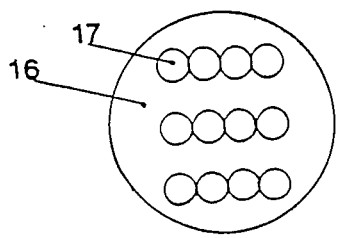
Figure 6:
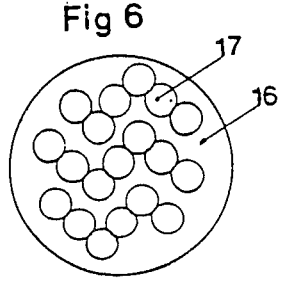
Figure 7:
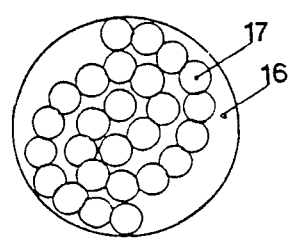

Configurations of tubes which can be produced by means of the schematically drawn apparatus of FIG. 1, are shown, by way of example, in FIGS. 2 to 7 and 28 to 30. The outside cross-section of each of the tube sheets shown in FIGS. 2 to 7 is circular. In FIGS. 2 to 7, the tube sheets are identified by number 16 and the tubes by 17. Each case involves tubes that contain several continuous tubes 17. Said continuous tubes 17 can be arranged in tube sheet 16 in various configurations. In FIG. 2, the continuous tubes 17 are arranged in tube sheet 16 in a hexagon shape. In FIG. 3, the continuous tubes 17 are arranged in tube sheet 16 in a quadrilateral shape. In FIG. 4, where only part of the tubes 17 is shown, the tubes 17 are arranged in a circular shape. FIG. 5 shows a linear arrangement, FIG. 6 a wavy line arrangement and FIG. 7 a spiral arrangement of continuous tubes 17 in tube sheet 16.

Figure 28:
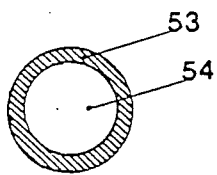
FIGS. 28 to 30 are cross-sections of single tubes.
Figure 29:
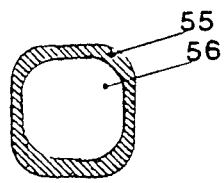
Figure 30:
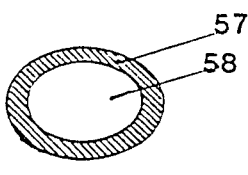

FIGS. 28 to 30 present various cross-sections of tubes that feature one continuous hollow space only. Tube 53 with continuous hollow space 54 shown in FIG. 28 has a circular outer cross-section and a circular inner cross-section. Outer and inner cross-sections may be symmetrical as in FIG. 28, or they may be asymmetrical. When the configuration of the outer and inner cross-sections is asymmetrical, the wall of tube 53 is of varying thickness along its perimeter.

Tube 55 is FIG. 29 presents a square outer cross-section with rounded corners. The continuous hollow space 56 of said tube 55 also presents a square inner cross-section with rounded corners. Instead of a square inner cross-section, tube 55 of FIG. 29 could also have a circular inner cross-section. Similarly, the outer cross-section could be circular with a square inner cross-section. Also, the outer and/or inner cross-section might be elliptical in shape as in tube 57 of FIG. 30 with continuous hollow space 58.

Figure 9:
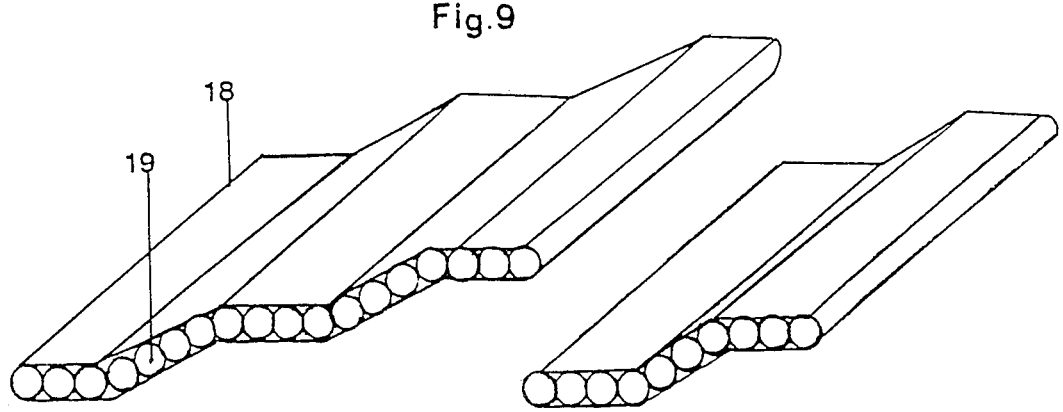
FIG. 9 is a schematic cross-section of a shaped tube sheet.
Figure 10:
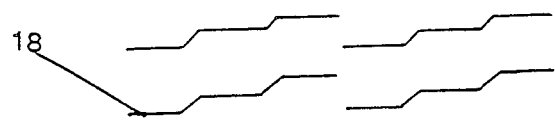
FIGS. 10 to 15 are schematic cross-sections of variously shaped tube sheets.
Figure 11:
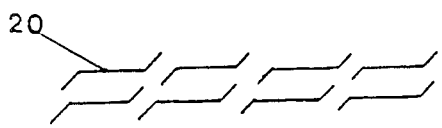
Figure 12:
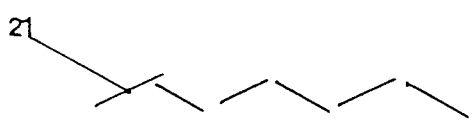
Figure 13:
Figure 14:
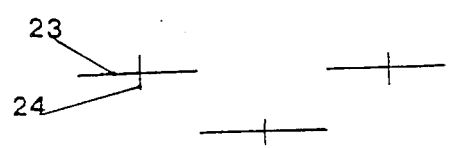
Figure 15:

When tubes are grouped together in parallel, structures such as shown in FIGS. 9 to 27 and 39 can be created. Here the groups of tubes have the form of a sheet. FIG. 9 shows groups of tubes 18 forming two sheets. The shape can essentially be described as a stepped configuration. The continuous hollow spaces 19 indicate that sheets 18 are composed of several tubes. Various shapes of tube sheets are shown in FIGS. 10 to 15 where the shapes the indicated by lines. The shapes can be described as follows: shape 18 in FIG. 10: stepped configuration (as shown in greater detail in FIG. 9); shape 20 in FIG. 11: sheets with angled edges; shape 21 in FIG. 12: roof-shaped sheets; shape 22 in FIG. 13: sloping sheets with angled edges; shapes 23 and 24 in FIG. 14: sheets in cross shape; and sheet 25 in FIG. 15; V-shaped sheets. The various shapes of the tube sheets are capable of determining certain flow conditions in the fluid that surrounds them.

Figure 8:
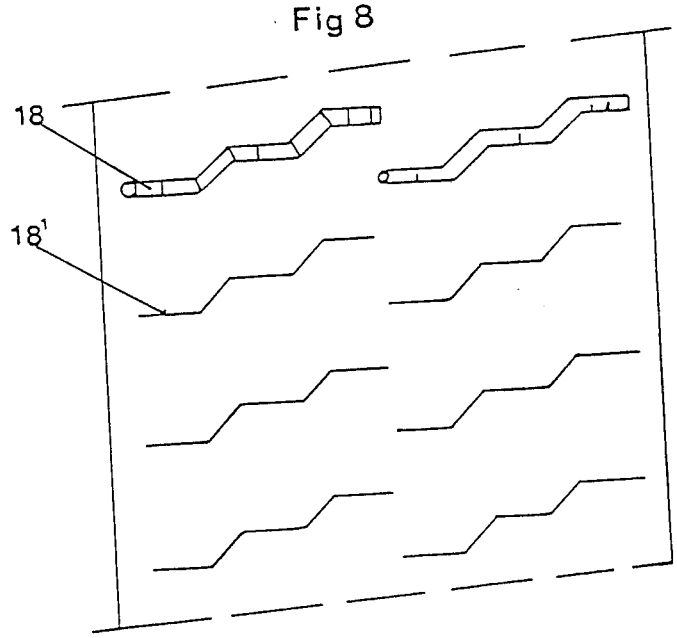
FIG. 8 is a schematic cross-section showing the arrangement of shaped tube sheets.

Several such sheets are arranged side-by-side to obtain a large exchanger surface. This is indicated in FIG. 8 where the shape of FIGS. 9 and 10 was used and where several sheets 18 have been arranged side-by-side. In 18 the shapes of the sheets are outlined without showing the continuous hollow spaces. In 18' the shapes are indicated by simple lines.

Figure 16:
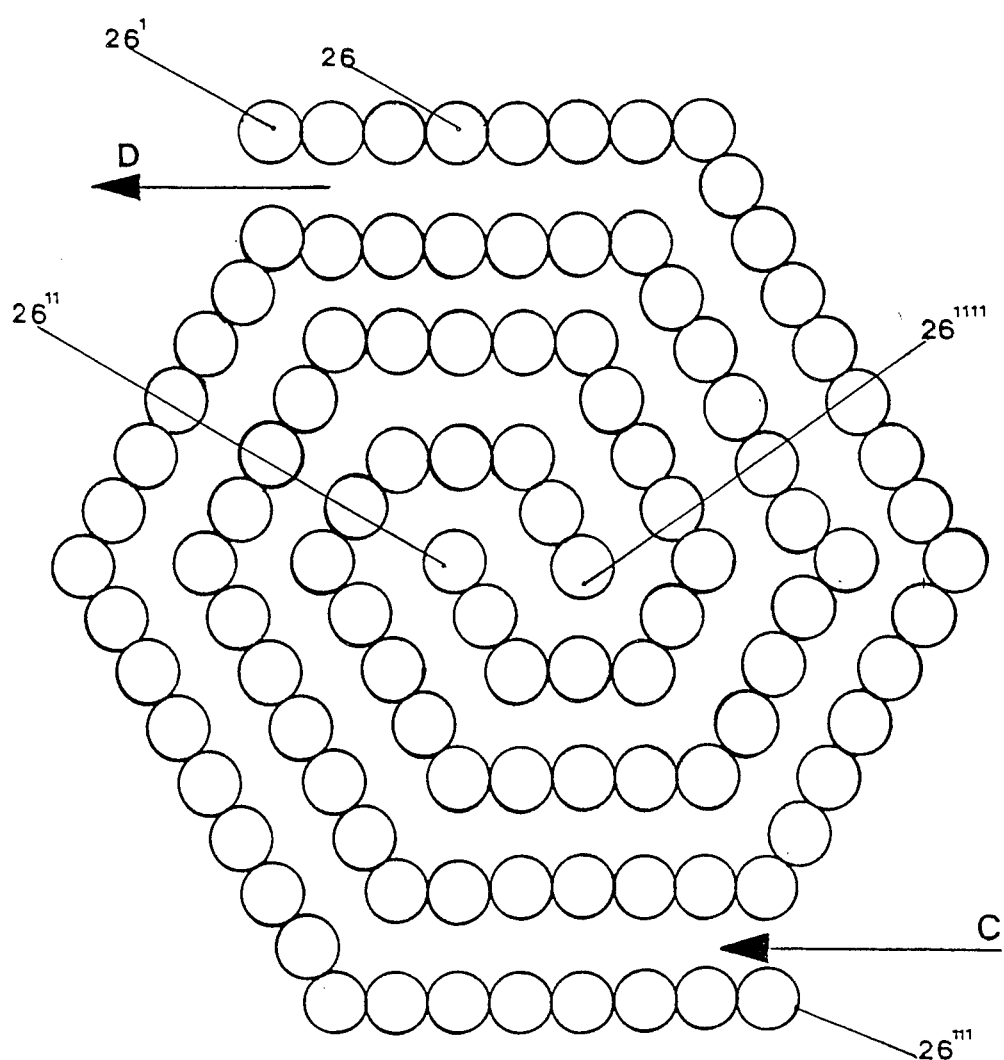
FIG. 16 is a schematic cross-section of a spiral arrangement of two groups of tubes.

FIG. 16 shows, by way of example, a spiral configuration of two groups of tubes, one group of tubes being compared of tubes 26 with the ends of that group of tubes being designated by 26' and 26". The ends of the other group of tubes are designated by 26''' and 26''''. These two groups of tubes may also be composed of groups of tube sheets, so that two spiral-shaped groups of tube sheets are created. If two groups of spiral-shaped shaped tube sheets are assembled in the manner of FIG. 16, a channel is created for the fluid that is to flow past the tubes in the finished heat and/or fluid exchanger. In said channel, for example, the fluid may flow along the perimeter in the direction of arrow C, change direction in the center, flow along the perimeter in the direction of arrow D and flow out of the channel. In this process, the fluid changes its direction of rotation once. This enhances the effectiveness of such a heat exchanger.

FIGS. 17 to 27 show, by way of example, the internal structure of the tube sheets in schematic partial cross-section. Sheet 27 of FIG. 17 features continuous hollow spaces 28 of circular cross-section. The projections 29 on sheet 27 are called turbulence enhancers and serve to create turbulent flow in the fluid flowing past the sheet. FIG. 18 shows a web plate sheet 30 that features continuous hollow spaces 31 with a square cross-section and turbulence enhancers 32. Since the walls of the tube sheet of FIG. 18 are relatively thin, the turbulence enhancers 32 can also act as reinforcing ribs for sheet 30. FIG. 19 also show a web plate sheet 33 with thicker walls and continuous hollow spaces 34. Here, the turbulence enhancers are designated by 32'.

FIG. 20 shows a partial view of a group of tubes comprising two types of tubes. The two types differ mainly in their diameter. In the configuration of FIG. 20, tubes 35 of large diameter alternate with tubes 36 of small diameter. The outer edge of this configuration is provided with an edge 37 of solid material that serves to protect against erosion and damage. Edge 37 can be formed, for example, by welding a solid wire to outer tube 35. In FIG. 21, several tubes 38 of identical diameter are joined together.

In FIG. 22, sheet 41 features continuous hollow spaces 40 of elliptical cross-section. Sheet 41 is reinforced at its outer edge—again as protection against erosion and damage. Sheet 42 in FIG. 23 has several continuous hollow spaces 43 of circular cross-section. Sheet 42 is provided with protective edge 44. FIG. 24 shows another sheet 45 featuring circular continuous hollow spaces 46.

FIG. 25 shows a web plate sheet 47 with protective edge 48. FIG. 26 also shows a web plate sheet which includes a hollow protective edge 50. In web plate sheet 51 of FIG. 27 the last web at the outer edge of the sheet is cut open and a solid wire 52 is inserted as protective edge.

Figure 31:
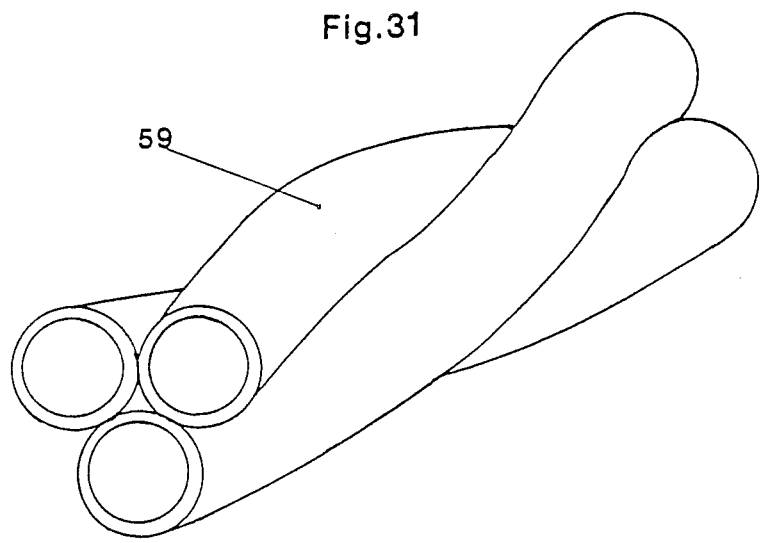
FIG. 31 is a perspective view of three tubes twisted together.

FIG. 31 shows a group of tubes comprising three tubes 59 twisted together. Similar arrangements can also be achieved by interweaving some tubes as "weft tubes."

The cross-sections of tubes or groups of tubes shown in the drawings, by way of example, are all well suited to implement the method of the invention for the production of heat and/or fluid exchangers.

Figure 32:
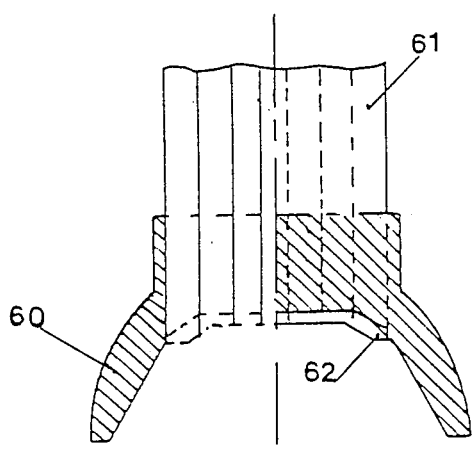
FIGS. 32 and 33 are schematic views of tube sheets in an insert.
Figure 33:
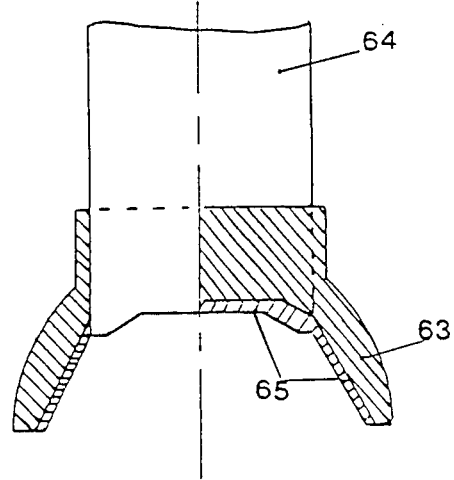

FIGS. 32 and 33 show in schematic form how tube sheets can be inserted into inserts. In insert 60 of FIG. 32, tube sheets 61 are inserted side-by-side. Thermoplastic material 62 is injected in accordance with the invention to bond the tubes to the insert.

In insert 63 of FIG. 33, sheets 64 are arranged one behind the other and are joined to insert 63 by thermoplastic material 65.

Figure 34:
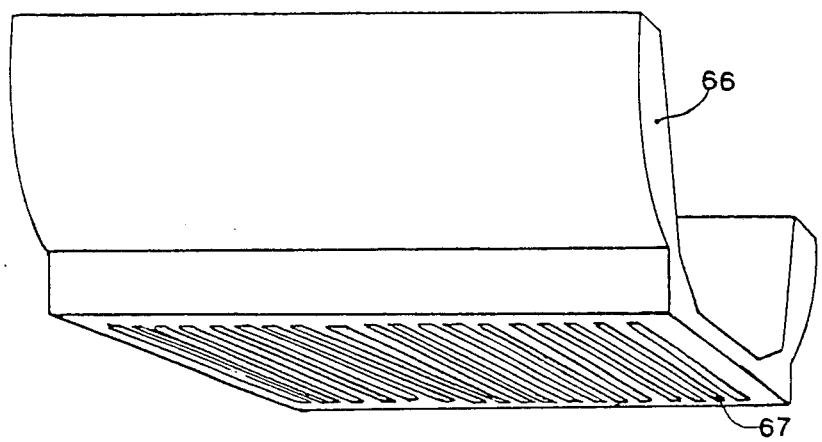
FIGS. 34 and 35 are perspective views of two insert embodiments.
Figure 35:
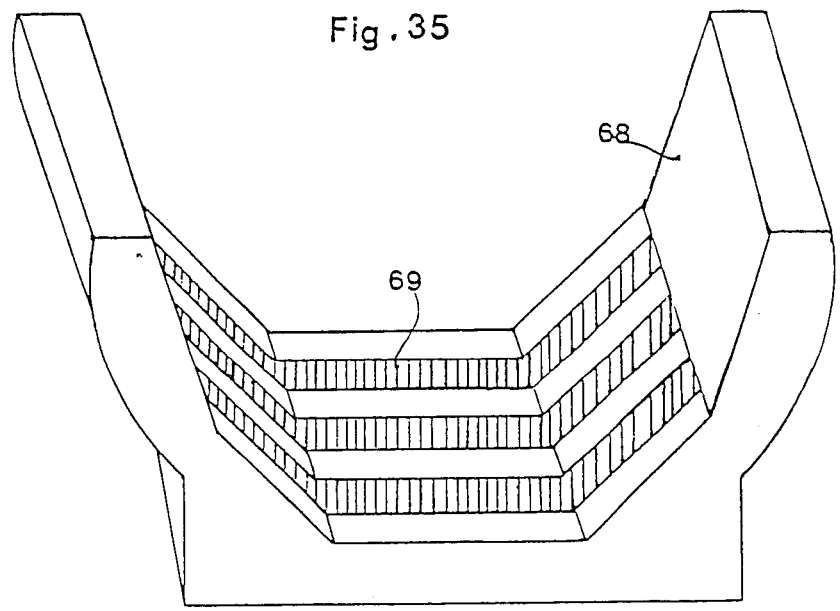

FIGS. 34 and 35 are perspective drawings of the two embodiments, 66 and 68, of the insert in which continuous openings, 67 and 69, respectively, are provided for the insertion of tube sheets.

Figure 36:
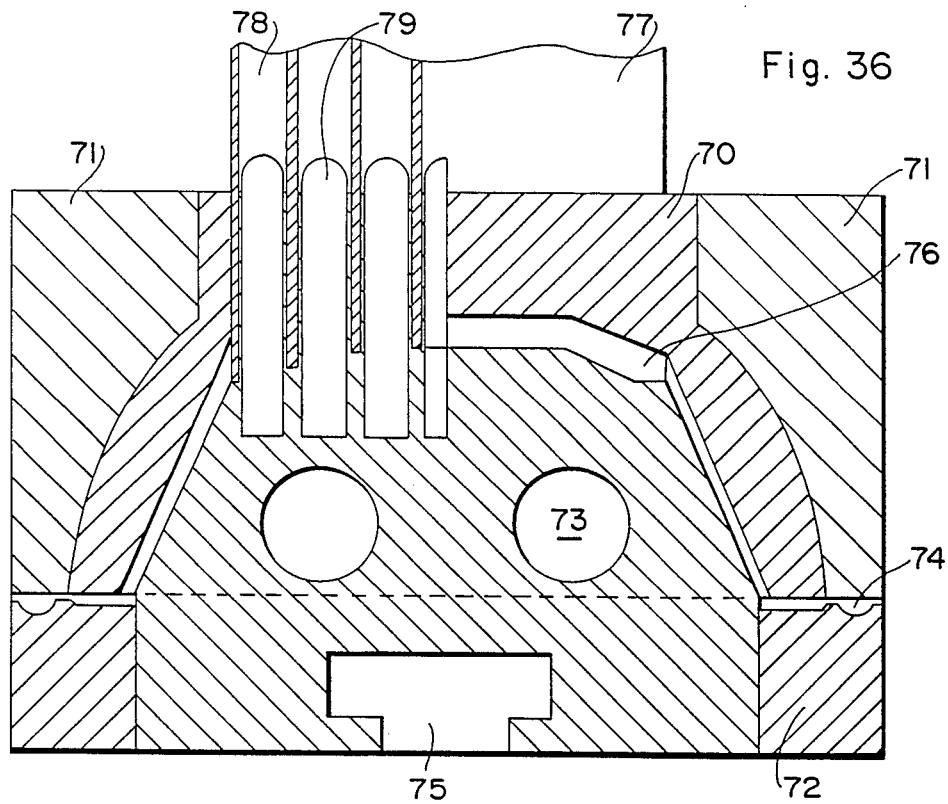
FIGS. 36 and 37 are schematic views of two embodiments of the invention for the production of sheet fluid and/or sheet heat exchangers.

FIG. 36 shows one embodiment of the invention for the production of tube sheet heat and/or fluid exchangers. Insert 70, which also serves as positioning element for the tube sheets, is inserted in top mold 71 which, in turn, is positioned on bottom mold 72. Bottom mold 72 features continuous hollow spaces 73 provided for the passage of a cooling or heating fluid. Sprues 74 are also provided in bottom mold 72. A T-shaped recess 75 is milled into bottom mold 72; it serves to hold bottom mold 72 in the frame of the injection molding machine. Bottom mold 72 holds mandrels 79 which are locked in position. A tube sheet 77 is positioned in insert 70 so that each of the continuous hollow spaces 78 of sheet 77 encloses one mandrel. The continuous hollow spaces 78 of tube sheet 77 as well as mandrels 79 are shown only in the left-hand portion of the schematic drawing in FIG. 36. As FIG. 36 shows, cavity 76, which is to be filled with thermoplastic material by injection molding, is formed by bottom mold 72, tube sheet 77, insert 70 and, if applicable, by mandrels 79.

The method of the invention is implemented as follows: Insert 70 and top mold 71 are placed on bottom mold 72 which is anchored in the injection molding machine. Thereupon a tube sheet 77 is placed in each traversing opening of insert 70 so that a mandrel 79 is positioned in each continuous hollow space 78 of tube sheet 77. After all tube sheets 77 have been positioned, they are secured against axial shift by any known means. After bottom mold 72 and, thus, mandrels 79 have been heated to a temperature of $T_c$, a thermoplastic polymer can be injected under pressure through sprue 74. Toward the end of the injection process, the cooling of bottom mold 72 and, thus, of mandrels 79 takes place. After the thermoplastic polymer has solidified, top mold 71—which was designed in two parts for this purpose—is removed, whereupon insert 70 can be pulled off, along with tube sheets 77 anchored in it. A new insert 70 and top mold 71 are then placed on bottom mold 72 again. The free ends of tube sheets 77 can now be inserted together into the openings of second insert 70.

Figure 37:
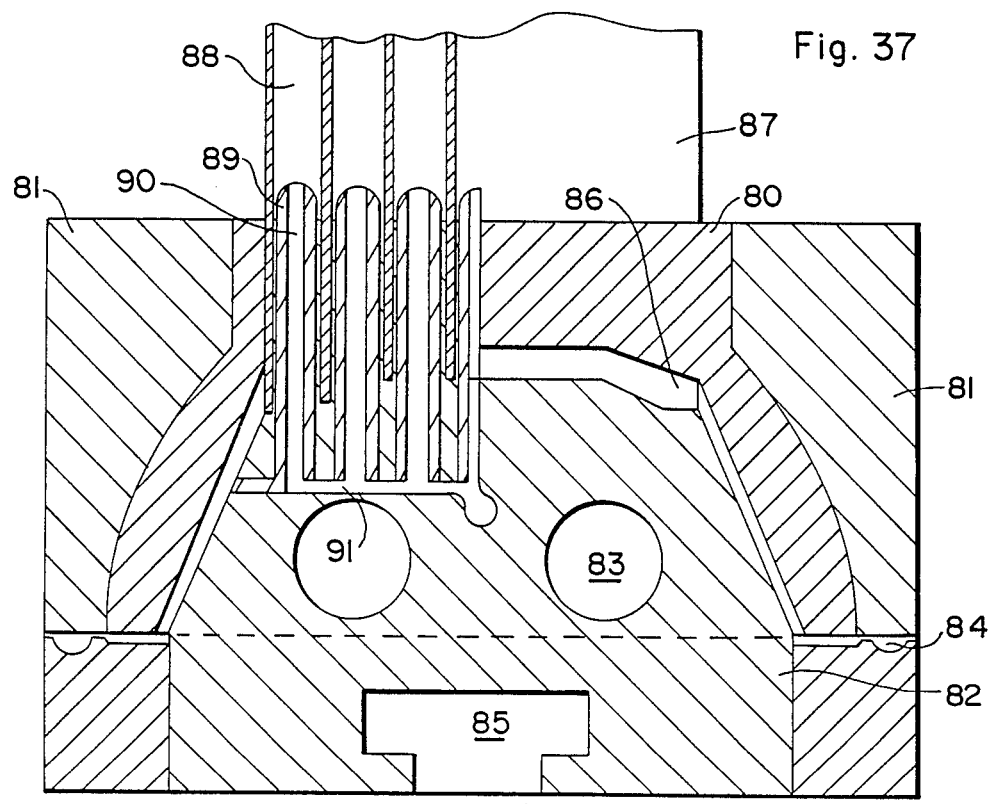

FIG. 37 shows a further embodiment of the invention for the production of tube sheet heat and/or fluid exchangers. In this embodiment of the invention, the insert is designated by 80, the top mold by 81 and the bottom mold by 82. Mandrels 89, each of which features a continuous hollow space 90, are locked into bottom mold 82, T-shaped recess 85 has been milled into bottom mold 82 for mounting in the injection molding machine. Thermoplastic material is injected into cavity 86 via sprue 84. All continuous hollow spaces 90 in mandrels 89 are connected to distributor 91 by means of which cooling or heating fluid can be supplied or drawn off through the continuous hollow spaces 90 of mandrels 89. Bottom mold 82 has its own heating or cooling system 83. Sheet 87 with continuous hollow spaces 88 is positioned in insert 80. The continuous hollow spaces 88 in sheet 87 and mandrels 89 are shown in the left half of the drawing only.

Figure 38:
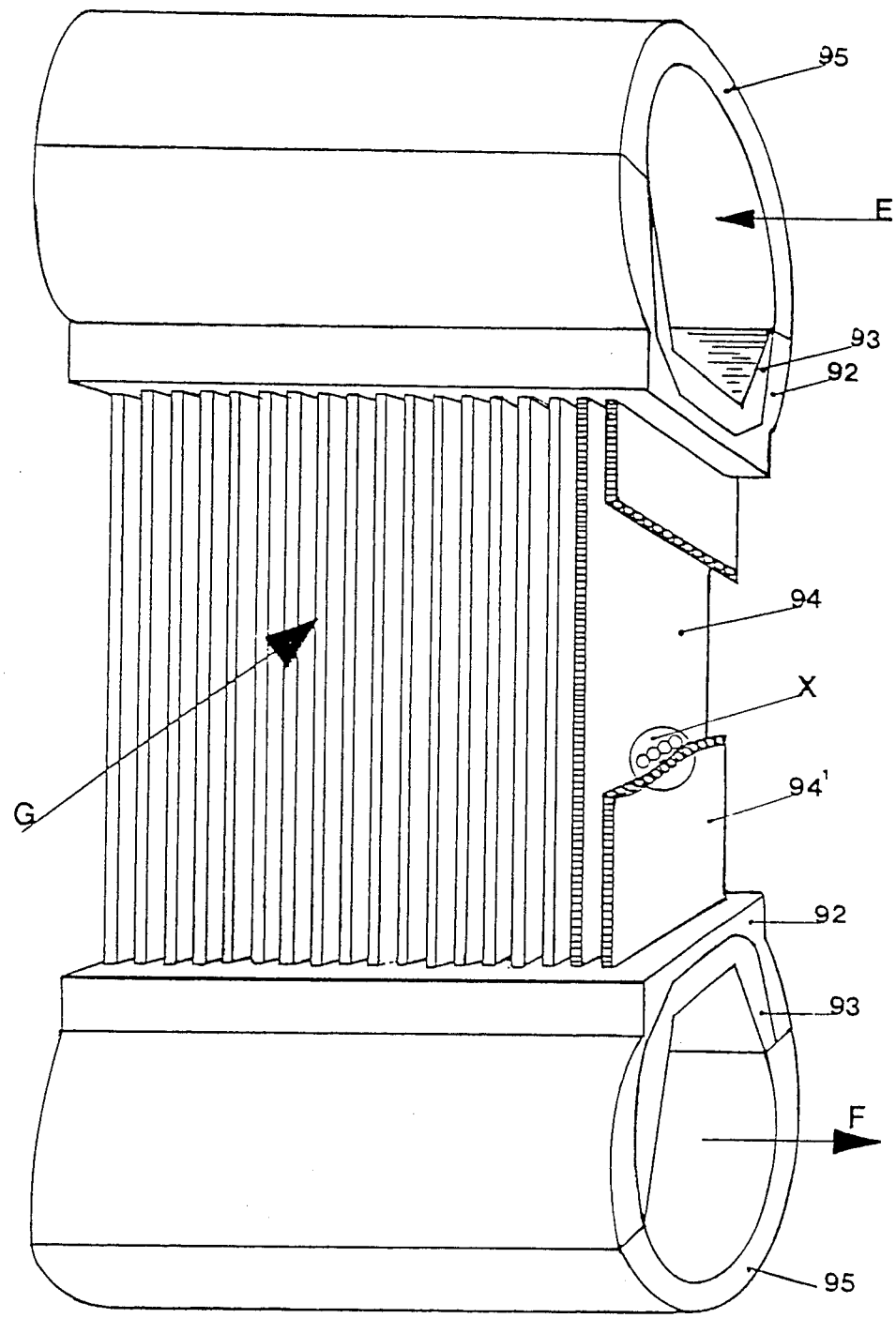
FIG. 38 is a perspective view of a tube sheet heat exchanger, with tube connections, produced in accordance with the method of the invention.
Figure 39:
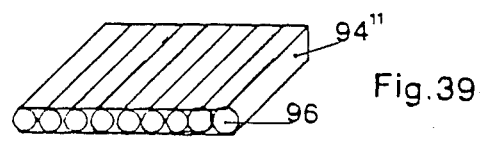
FIG. 39 shows detail X from FIG. 38.

FIG. 38 is a perspective drawing of a tube sheet heat exchanger produced in accordance with the method of the invention and provided with two tube connections. Tube group sheets 94 are bonded at either end by means of injection molding material 93 to insert 92 to which has been welded a half tube 95. In FIG. 38, front sheet 94' is cut open to show clearly that each tube sheet 94 has a plurality of continuous hollow spaces, as is evident at the cut-off edge of tube sheet 94'. FIG. 39, which shows detail X of FIG. 38, illustrates the structure of tube sheet 94' by showing section 94" of the tube sheet with its continuous hollow spaces 96.

FIG. 38 is a tube sheet heat exchanger, produced by the method of the invention, which is particularly well suited for the heating or cooling of gaseous fluids such as air. A cooling or heating fluid flows in the direction of arrow E through the upper pipe, formed by half pipe 95, insert 92 and thermoplastic polymer 93, through the continuous hollow spaces 96 of tube group sheets 94 and out through the lower pipe in the direction of arrow F. A gas forced to flow through the sheets in the direction of arrow G can thus be heated or cooled. Similarly, the fluid entering in the direction of arrow E and leaving in the direction of arrow F may be cooled or heated by the flow of gas (in the direction of arrow G).

Figure 40:
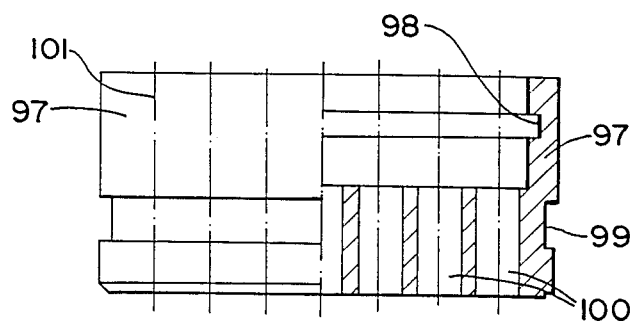
FIG. 40 is a schematic view of an insert with grooves, along the inside and outside perimeters.

FIG. 40 is a schematic view showing the structure of an insert 97 with a groove 98 along its inside perimeter and a groove 99 along its outside perimeter. This type of insert 97 may, for example, be placed in an injection mold as in Figure 1. The right half of the drawing shows a sectional view and the left half a top view of insert 97. The continuous hollow spaces 100 are shown in sectional view. In the top view, the position of additional continuous hollow spaces is indicated by dot-and-dash lines 101. Groove 98 along the inside perimeter of insert 97 prevents axial shift of the insert after injection molding and curing of the thermoplastic material. Groove 99 along the outside perimeter secures insert 97 against axial shift in the injection mold. Groove 99 can also be used for sealing purposes, for instance, when the insert joined to the tubes is inserted into a housing.

Figure 41:
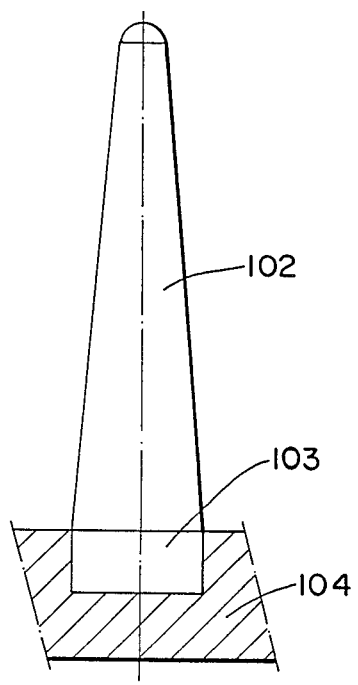
FIGS. 41 and 42 show two possible embodiments of mandrels tapered at the free end.

FIG. 41 shows a mandrel 102 whose free end is conical. The tip of the free end is truncated and here has a semispherical shape. The other end 103 of mandrel 102 is cylindrical and is embedded in the base 104 of an injection mold, only partially shown here.

Figure 42:
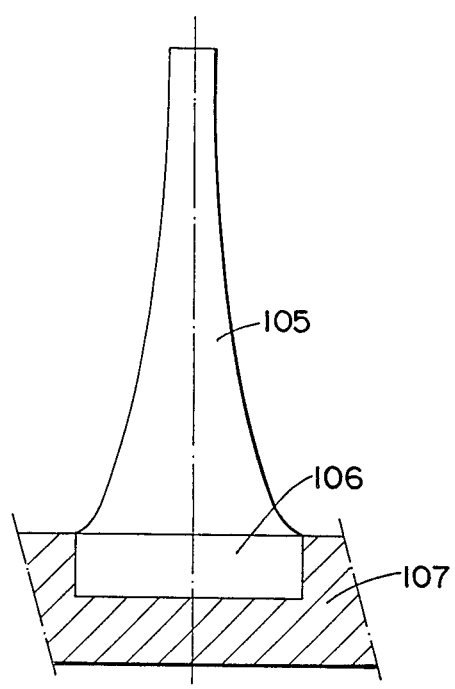

FIG. 42 shows mandrel 105 whose cross-section also decreases toward the free end. The outside contour can be described as being in the shape of a parabola. Mandrel 105 is embedded at its cylindrical end in a base 107, only partially shown here. Since the inner surface of the tubes and/or the thermoplastic material take on the shape of the mandrels after the injection molding process, the shape of mandrel 105 shown in FIG. 42 is advantageous for favorable flow conditions in the finished heat and/or fluid exchanger.

Figure 43:
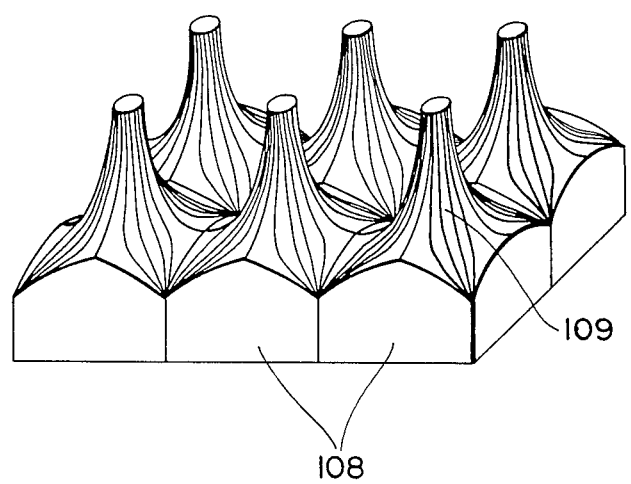
FIG. 43 is a basic sketch of a possible arrangement of several mandrels as in FIG. 42.

To avoid many cylindrical drill holes next to each other in the base of the injection mold, the back end 108 of mandrels 109 may be given square cross-sections, so that the mandrels can be placed side-by-side and then embedded together in the base of the injection mold. Such an arrangement is shown in FIG. 43 with six mandrels 109. Other cross-sections lend themselves from the back end of mandrels 109, such as hexagonal or rectangular cross-sections. Thus, the inlet channels into the tubes can be shaped to achieve favorable flow conditions.

EXAMPLE 1

FIG. 1 shows an apparatus of the invention, in assembled form, for the production of tube sheets. In this drawing the top mold is designated by 1 and the bottom mold by 2. A cylindrical insert 3, whose base has a traversing opening 10 for each tube, is inserted in bottom mold 2 (FIG. 1 shows only one such traversing opening). A porous polypropylene tube, with an inner diameter of 5.5 mm and outer diameter of 8.6 mm is introduced into the opening 10 of cylindrical insert 3 and is moved to the upper edge of the insert. It is advantageous, here, for the openings 10 in the cylindrical insert in the bottom mold to provide a clearance fit with to the outside diameter of the tubes that are to be inserted in the openings 10 of the cylindrical insert before the injection molding process. The concept of clearance fit is defined in DIN 7182, p. 2. Similarly, it is useful for the outside diameters of the mandrels to provide a clearance fit with the inside diameter of the tubes. A tube 8 is in the cylindrical insert, in the lower part of bottom mold 2. Additional tubes 8 are inserted along dot-and-dash lines 11, as indicated in FIG. 1.

Top mold 1 consists of support 4, material No. 1.2419, into which is mounted coolant distributor 5, material No. 1.2419 and mandrel carrier 6, material No. 1. 2419. Support 4, coolant distributor 5 and mandrel carrier 6 may, for example, be held together by screws, the location of which are indicated by dot-and-dash line 130.

Mandrels 7, material HWS which include a traversing drill hole of 2 mm diameter, are mounted into mandrel carrier 6. For clarity, only one mandrel 7 is shown. Additional mandrels 7 may be placed, for example, along dot-and-dash lines 11. The free end of mandrel 7 (e.g., the end of the mandrel which extends into insert 3) is shaped as a truncated pyramid (15°). The length of the mandrels is such that their free ends extend 15 mm into the opening of insert 3, so that the length of the mandrel portion protruding from the top mold is greater than the thickness of the tube sheet to be produced. In the example described here, the thickness of the polypropylene tube base measures 0.2×D. The continuous hollow spaces of mandrels 7 are supplied with coolant (air 18° C., supply pressure 0.8–1.0 bar) via the coolant inlet—notified in the drawing by arrow B—and via coolant distributor 5. After passing through the mandrels, said coolant flows into tubes 8, leaving tubes then at their back end (e.g., the end not in the mandrel).

Insert 3 is provided at its outer surface with a groove 9 that is 44 mm wide and 2 mm deep. Bottom mold 2 engages with groove 9 to ensure axial alignment of insert 3. The bottom mold is made of two parts (not shown in the drawing) so that insert 3 can be inserted into bottom mold 2.

Top mold 1 is provided with sprue 12 through which the polypropylene melt for the production of the tube base is forced in the direction of arrow A under a pressure of 40 bar and at a temperature of 235° C. The melt then moves into cavity 15 which is formed by insert 3, mandrel carrier 6 (top mold) and tubes 8. A pressure of 15 bar must be maintained until the injected polypropylene material has cooled below the melting point temperature. The plasticized polypropylene material is filled with 30% glass fibers to reduce shrinkage. The melt index of the polypropylene used is 9 g/10 min (according to MFI 230-5), the crystallite melting temperature is 160°–166° C., and the melting point is 230°–250° C.

Drill holes 13 are provided in support 4 of top mold 1 and drill holes 14 are provided in bottom mold 2. Cooling or heating fluids can flow through said drill holes to temper the injection mold. Before the first injection, the mold is brought to a working temperature of 70° C. by forcing the heating fluid through channels 13 and 14. This temperature is maintained throughout the injection molding process. Upon completion of the injection molding process, the two halves of the injection mold are separated and insert 3, now bonded to a tube sheet, is removed.

EXAMPLE 2 (COMPARATIVE EXAMPLE)

An injection mold made of chrome steel consists of a top mold and a bottom mold which, when assembled, form a rectangular parallelepiped that is 200 mm long, 150 mm wide and 50 mm high. The bottom mold is 30 mm high, the top mold is 20 mm high.

The bottom mold is also provided with a roughly rectangular recess that is 5 mm deep. The distance from the upper edges of said recess to the outer edges of the bottom mold is 50 mm. 28 rows of 20 mandrels each are embedded in the floor of this recess, whose area is 100 times 50 mm². Each row is parallel to the short side of the recess. The center-to-center spacing between neighboring rows is 3.4 mm; the center-to-center spacing between mandrels within the same row is 2 mm. The rows, and the mandrels within each row, are centered with respect to the outer edges of the recess.

Each mandrel is 30 mm long and originally was cylindrical with an outside diameter of 1.7 mm. The front and back of these mandrels were flattened to a thickness of 1.2 mm, the flattened faces being arranged parallel to the rows. The upper 3 mm of the mandrels that are farthest removed from the floor of the recess are conically tapered.

Twenty-eight slots are provided in the top mold, with 3.4 mm center-to-center spacing. Each slot is 95 mm long and 1.5 mm wide. The slots are arranged to go from one side to within 55 mm of the other side, giving the top mold a comb-like appearance. A lateral block, also having a comb-like structure, has 28 teeth with 3.4 mm center-to-center spacing. It is inserted into the top mold from the side and secured so that the teeth of the lateral block fit into the slots of the top mold. Each tooth of the lateral block is 1.45 mm wide, 55 mm long and 20 mm high, so that when the lateral block and the top mold are fitted together, there remains 40 mm-long traversing slots into which the tips of the mandrels can fit when the top mold is positioned on the bottom mold. Tube sheets made of polyvinylidene fluoride, with an outside width of 39.9 mm and an outside thickness of 1.4 mm, which contain 20 continuous openings (channels) of rectangular cross-section with rounded corners (greatest length 1.75 mm, greatest width 1.25 mm, corner radius r=0.2 mm), are each placed on the mandrels of one row so that said tube sheets rest on the floor of the recess of the bottom mold.

At this point, the injection mold is brought to a temperature of 25° C. Polyvinylidene fluoride ($T_m = 176°$ C., along with this melting point, the PVDF is characterized by a melt index in accordance with ISO norm 1133. Said melt index has a value of 5.5 at 235° C. and of 10.0 at 270° C. The latter temperature is significant for Example 7.) is injected as a melt through a sprue that is provided parallel to the long side of the recess, the melt being at 235° C. when it flows into the recess. When the injection mold has been completely filled with melt, the pressure exerted on the melt is maintained at 30 bar until the temperature of the injection melt has dropped to 160° C.

After the melt has completely cooled off and solidified, the tube base produced is removed from the injection mold together with the tube sheets that are now joined to said tube base.

This tube base cast from the melt is 4% smaller by volume than the volume of the recess in the bottom mold. Due to this volumetric shrinkage during the solidification of the melt, the tube sheets are so firmly locked in the tube that the surface of the tube sheets has a wavy or creased aspect at the point where the tube sheets emerge from the tube base. At 20° C., the internal pressure at which the partitions of the (not yet cast) tube sheets will burst within 60 seconds is about 28 bar. However, when the tube bases are cast in the manner described above, the partitions will burst within 60 seconds under a pressure of only 6 bar.

EXAMPLE 3 (COMPARATIVE EXAMPLE)

The method of Example 2 is applied, except that the temperature of the injection mold—and, thus, the temperature of the tube sheets—is raised to 65° C. by means of a heating fluid (oil) before the PVDF (polyvinylidene fluoride) melt is injected into the recess. The heating fluid is pumped through channels provided in the injection mold.

The tube base produced, to which the tube sheets are joined, now presents a volumetric shrinkage of 4.6%. At the point where the tube sheets emerge from the tube base, the sheets are again wavy or creased. Again, the pressure at which the tube sheets will burst within 60 seconds in about 6 bar.

EXAMPLE 4

As in Example 2, a recess that is 3 mm deep, 102 mm long and 52 mm wide, is provided in the top mold into which the lateral block has already been fitted and secured. An insert made of PVDF that is 3 mm thick, 101 mm long and 51 mm wide is placed in the recess. In accordance with the arrangement of the mandrels, the insert presents 28 slots that are congruent with the slots formed by the top mold and the lateral block and which are configured so as to align with these upon insertion.

After the injection mold and the insert have been assembled and the tube sheets have been placed as described in Example 1, the injection mold is heated to 25° C. and the PVDF melt is then injected at a temperature of 235° C. into the recess of the bottom mold until a pressure of 30 bar is reached. The injection mold is now cooled to 160° C. at this pressure.

After complete cooling, the insert, which is now joined to the tube sheets by the injection molding material, is removed from the injection mold.

The volumetric shrinkage of the tube base is now only 2.3% in relation to the volume of the recess in the bottom mold. The tube sheets no longer present any waviness or creases at any point, and the pressure at which the tube sheets will burst within 60 seconds is about 28 bar.

Any attempt to pull the tube sheets out of the tube base, composed of the insert and the injection molding material, requires a force of 250 N per tube sheet.

EXAMPLE 5

Example 4 is repeated, but before the molding material is injected, the temperature of the injection mold and, thus, the temperature of the tube sheet insert is set to 65° C.

After the tube sheets, insert and injection molding material are removed from the injection mold, it can be seen that the volumetric shrinkage is 2.2% and that the bursting pressure is 28 bar again. Even with a force of 1350 N, none of the tube sheets can be pulled out of the tube base.

EXAMPLE 6

Example 4 is repeated, but the temperature of the injection molding equipment is set to 110° C. while the temperature of the insert and of the tube sheets is raised in a separate furnace so that they will still be at a temperature of 145° C.—after being inserted into the injection mold—when the molding material is injected.

When the injection mold has cooled off, the pressure at which the material is injected is reduced from 30 bar to 15 bar, but is then raised within 15 seconds to 40 bar and left at this level for 15 seconds, after which the pressure is dropped to 0 bar.

By this method, it is possible to add injection molding material into the injection mold after cooling, whereby the shrinkage of the originally injected material is compensated.

After removing from the injection mold the tube sheets, insert and injection molding material, it is observed that the volumetric shrinkage of the injection molding material is now only 2%, while the bursting pressure is again 28 bar. None of the tube sheets could be pulled out of the tube base, even with a force of 1350N.

EXAMPLE 7

The conditions of Example 5 are maintained, but the injection temperature for the PVDF melt is raised to 270° C. During injection of the melt under the desired pressure of 30 bar, melt escapes through the slots of the top mold (between slot wall and outer wall of the tube sheets).

Nonetheless, the product obtained by this method again presents a bursting pressure of 28 bar. The tube sheets cannot be pulled out of the tube base with a force of bout 1000 N. When an additional force of another 1000 N is applied, one observes stretching (elongation) of some tube sheets in the area of the melt escape point. So much polymer has escaped from these sheets that it came into contact with the tube sheets in an area where said tube sheets are no longer supported by the mandrels, causing pronounced deformation of the tube sheets and producing some bubbles in the walls.

This example demonstrates that selection of excessively high temperatures may affect the success of the method disclosed by this invention. But the escape of melt through the slots at the temperatures cited can be prevented by coordinating the dimensions of the tube sheets and the slots in the insert so that the gap between tube sheet and slot wall is reduce (e.g., tube sheet thickness 1.45 mm, slot width 1.5 mm).

EXAMPLE 8

Example 4 is repeated, but the temperature of the injection mold and the temperature of the tube sheet insert is adjusted to 80° C. before injection of the molding material, to which has been added 20% phlogopite (mica), even distributed. The maximum dimension of the mica flakes was $300 \times 10^{-6}$ m.

After removal from the injection mold of the tube sheets, insert and injection molding material, it can be observed that the volumetric shrinkage of the injection molding material was also 2%, while bursting pressure was 28 bar. None of the tube sheets could be pulled out of the tube base, even with a force of 1350 N.

What is claimed is:

1. A method for the production of heat and/or fluid exchangers comprising a plurality of tubes firmly bonded to an insert by injection molding of a plastic material by means of an injection mold comprising at least a first part and a second part and further comprising mandrels which are adapted to be insertable into the tubes, said method comprising:

inserting and securing a tube positioning insert into said first part of said injection mold, said insert including a floor containing a traversing opening for each tube;

inserting a said tube into each opening of the insert, said tubes being made of nonporous plastic material or porous plastic material with a pore volume of up to 90%, each tube having a hydraulic diameter $d_h$ of from 0.5 to 25 mm and a wall thickness at the thinnest point of from about 5 to 25% of said hydraulic diameter $d_h$;

inserting a mandrel into each tube in such a manner that the mandrels ensure support for the tubes over the total length to be embedded in a tube base;

closing said injection mold;

attaching said first and second parts of said injection mold to each other;

heating the tubes to a temperature $T_c$ that is below the melting point temperature $T_m$ of the tube material, and heating the plastic material to a temperature $T_i$ that is higher than $T_m$, the temperature differentials $T_i - T_m$ and $T_m - T_c$ being chosen so that when the molten plastic material is injected, the tubes are temporarily heated to a high enough temperature to be firmly fused to the insert in the area of the insert openings at least over a distance equal to the thickness of the tube walls;

injecting a molten plastic material under high pressure through a sprue provided in the injection mold and into a cavity formed by the injection mold, the insert and the tube ends, said insert, said tubes, and said plastic material all comprising thermoplastic polymer of the same basic structure where said insert and said tube are firmly bonded by said plastic material;

cooling the plastic material while said plastic material is maintained under pressure;

separating said first and second parts of said injection mold, removing said mandrels, and removing said tubes which are now firmly bonded to said insert by said plastic material from said first part of the injection mold.

2. The method of claim 1, wherein the plastic material is a thermoplastic material.

3. The method of claim 1, wherein the insert is made of plastic material.

4. The method of claim 1, further comprising locking the mandrels into said second part of said injection mold.

5. The method of claim 1, further comprising inserting said tubes into said openings of the insert in such a manner that the tube ends protrude through the bottom of the insert to the inside of the insert.

6. The method of claim 1, further comprising cooling the injection mold to cool the thermoplastic material.

7. The method of claim 1, further comprising cooling the mandrels either during or after the injection molding process or both during and after the injection process.

8. The method of claim 7, further comprising using mandrels which include continuous hollow spaces through which a coolant can flow to cool the mandrels.

9. The method of claim 8, further comprising using a gas as said coolant.

10. The method of claim 9, further comprising using air as said gas.

11. The method of claim 1, further comprising initially assembling said tubes into groups of tubes and inserting the groups of tubes into corresponding groups of traversing openings in the insert floor.

12. The method of claim 11, wherein the tubes are assembled into groups of tubes with approximately parallel axes, so that the cross-section of a group of tubes perpendicular to their axes forms a sheet.

13. The method of claim 11, wherein between 20 and 2,000 tubes are assembled into one group of tubes.

14. The method of claim 13, wherein between 20 and 100 tubes are assembled into one group of tubes.

15. The method of claim 1, wherein said hydraulic diameter measures 0.5 to 15 mm.

16. The method of claim 1, wherein said tubes are made of nonporous material or of porous material with a pore volume of less than 50%, and a hydraulic diameter $d_h$ of said tubes measures 0.5 to 5 mm.

17. The method of claim 16, wherein the hydraulic diameter measures 0.8 to 3 mm.

18. The method of claim 17, wherein the tube walls have a thickness at their thinnest point equal to about 7.5 to 17.5% of said hydraulic diameter $d_h$.

19. The method of claim 1, wherein at an area at which said insert and said tube are bonded by said plastic material, said insert, said tubes, and said plastic material all comprise thermoplastic polymers having nearly the same melting point or range of melting temperatures.

20. The method of claim 1, wherein the temperature differentials $T_i-T_m$ and $T_m-T_c$ are selected so that when the molten plastic material is injected the tubes are temporarily heated to a high enough temperature to fuse with the insert along approximately the full range of the length of the openings of the insert.

21. The method of claim 1, wherein the temperature differential $T_i-T_m$ is between 20° and 90° C.

22. The method of claim 21, wherein the temperature differential $T_i-T_m$ is between 30° and 70° C.

23. The method of claim 1, wherein the temperature differential $T_m-T_c$ is equal to or greater than $T_i-T_m$ and equal to or less than $T_m-40°$ C.

24. The method of claim 9, wherein a tube temperature is selected and is set during and after the injection of the molten plastic material by means of said gas that flows through the hollow spaces in the mandrels.

25. The method of claim 1, wherein the material of the tubes, the inserts and the injected plastic material is a mold-injectable copolymer based on a fluorocarbon compound.

26. The method of claim 25, wherein the fluorocarbon compound is PVDF.

27. The method of claim 1, wherein the material of the tubes, the inserts and the injected plastic material is polypropylene.

28. The method of claim 1, wherein the material of the tubes, the inserts and the injected plastic material is polyethylene.

29. The method of claim 1, wherein the material of the tubes, the inserts and the injected plastic material is polybiphenol carbonate.

30. The method of claim 1, further comprising bonding free ends of said tubes bonded to said insert to a second insert by means of said injection mold.

* * * * *

UNITED STATES PATENT AND TRADEMARK OFFICE
CERTIFICATE OF CORRECTION

PATENT NO. : 4,740,344
DATED : April 26, 1988
INVENTOR(S) : Rudi WOLLBECK et al

It is certified that error appears in the above-identified patent and that said Letters Patent is hereby corrected as shown below:

Column 5, line 10, after "to" (second occurrence) insert --a--;
            line 34, change "$T_i T_m$" to --$T_i - T_m$--.

Column 8, line 64, change "is" to --in--.

Column 9, line 14, change "the" (second occurrence) to --are--;
            line 21, change "15;" to --15:--;
            line 33, change "compared" to --composed--;
            line 35, change "26'''''." to --26''''.--;
            line 39, delete "shaped" (second occurrence);
            line 60, change "show" to --shows--.

Column 12, line 43, delete "to" (first occurrence).

Column 13, lines 4-5, change "n-tified" to --intensified--.

Column 14, line 61, change "in" to --is--.

Column 16, line 4, change "bout" to --about--;
            line 26, change "even" to --evenly--.

Signed and Sealed this

Thirteenth Day of September, 1988

Attest:

DONALD J. QUIGG

*Attesting Officer*          *Commissioner of Patents and Trademarks*